US010721603B1

(12) United States Patent
Verdot et al.

(10) Patent No.: US 10,721,603 B1
(45) Date of Patent: Jul. 21, 2020

(54) MANAGING NETWORK CONNECTIVITY USING NETWORK ACTIVITY REQUESTS

(71) Applicant: Nokia Solutions and Networks Oy, Espoo (FI)

(72) Inventors: Vincent Verdot, Saint-Yon (FR); Mathieu Boussard, Chailly-en-Bière (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/530,746

(22) Filed: Aug. 2, 2019

(51) Int. Cl.
| | | |
|---|---|---|
| *H04W 4/50* | (2018.01) | |
| *H04W 48/18* | (2009.01) | |
| *H04W 76/10* | (2018.01) | |
| *H04L 29/08* | (2006.01) | |
| *H04L 29/12* | (2006.01) | |
| *H04W 28/02* | (2009.01) | |

(52) U.S. Cl.
CPC .............. *H04W 4/50* (2018.02); *H04L 61/256* (2013.01); *H04L 67/141* (2013.01); *H04L 67/322* (2013.01); *H04W 28/0268* (2013.01); *H04W 48/18* (2013.01); *H04W 76/10* (2018.02)

(58) Field of Classification Search
CPC .......... H04W 4/12; H04W 4/16; H04W 4/18; H04W 4/30; H04W 4/50; H04W 4/60; H04W 4/70; H04W 8/26; H04W 8/30; H04W 40/00; H04W 48/00; H04W 48/18; H04W 28/0268
See application file for complete search history.

(56) References Cited

U.S. PATENT DOCUMENTS

| | | | | |
|---|---|---|---|---|
| 8,068,817 B1* | 11/2011 | Viswanath | ........ | H04L 29/12066 455/414.1 |
| 8,589,541 B2* | 11/2013 | Raleigh | ................. | H04L 47/822 709/224 |
| 9,275,204 B1* | 3/2016 | Orr | .......................... | G06F 21/30 |
| 2004/0203846 A1* | 10/2004 | Caronni | .............. | H04L 63/0492 455/456.1 |

(Continued)

OTHER PUBLICATIONS

Cheshire, Stuart, et al., "NAT Port Mapping Protocol (NAT-PMP)", Request for Comments 6886, Independent Submission, ISSN 2070-1721, Apr. 2013, 33 pages.

(Continued)

*Primary Examiner* — Jean A Gelin (57) ABSTRACT

A controller such as an instant micro-connectivity controller includes a transceiver configured to receive a network access request (NAR) associated with an activity of an application executing on a device in a managed network. The NAR indicates a request for access by the application for a duration of the activity and the NAR includes a timestamp and information indicating the duration. The controller also includes a processor configured to selectively grant the request based on information included in the NAR and generate configuration information for the managed network in response to granting the request. In some cases, the configuration information is used to configure one or more of authorizations for a network switch, a firewall, a network address translation (NAT) element, and a router to route messages associated with the activity of the application.

28 Claims, 5 Drawing Sheets

(56) References Cited

U.S. PATENT DOCUMENTS

| | | | | |
|---|---|---|---|---|
| 2008/0133760 | A1* | 6/2008 | Berkvens | H04L 61/2582 709/228 |
| 2008/0232304 | A1* | 9/2008 | Mooney | H04W 74/0875 370/328 |
| 2010/0002635 | A1* | 1/2010 | Eklund | H04L 41/147 370/329 |
| 2010/0251330 | A1* | 9/2010 | Kroeselberg | H04W 12/06 726/3 |
| 2012/0005718 | A1* | 1/2012 | Xiao | H04L 41/0893 726/1 |
| 2013/0231080 | A1* | 9/2013 | Cheuk | H04M 15/765 455/405 |
| 2014/0280896 | A1* | 9/2014 | Papakostas | H04W 4/50 709/224 |
| 2014/0310416 | A1* | 10/2014 | Durbha | H04L 47/70 709/225 |
| 2015/0249672 | A1* | 9/2015 | Burns | H04L 12/66 726/4 |
| 2015/0327052 | A1* | 11/2015 | Ghai | H04W 48/02 370/328 |
| 2016/0099963 | A1* | 4/2016 | Mahaffey | H04L 63/145 726/25 |
| 2016/0227471 | A1* | 8/2016 | De Foy | H04W 48/18 |
| 2016/0360336 | A1* | 12/2016 | Gross | H04W 4/025 |
| 2017/0041231 | A1* | 2/2017 | Seed | H04L 67/14 |
| 2017/0164378 | A1* | 6/2017 | Gunasekara | H04W 72/10 |
| 2017/0181060 | A1* | 6/2017 | Wang | H04W 48/20 |
| 2018/0332442 | A1* | 11/2018 | Shaw | H04W 4/70 |
| 2019/0273731 | A1* | 9/2019 | Kassner | H04L 45/74 |
| 2019/0281095 | A1* | 9/2019 | Ein-Gil | H04L 67/14 |
| 2019/0364492 | A1* | 11/2019 | Azizi | H04W 24/08 |

OTHER PUBLICATIONS

Wing, Dan, et al., "Port Control Protocol (PCP)", Request for Comments 6887, Internet Engineering Task Force, ISSN 2070-1721, Apr. 2013, 88 pages.

* cited by examiner

FIG. 5

MANAGING NETWORK CONNECTIVITY USING NETWORK ACTIVITY REQUESTS

BACKGROUND

Network devices are often grouped into managed networks, such as local area networks (LANs), to reduce the exposure of the internal devices to outside, and potentially hostile, networks. Access to the internal devices in the managed networks is mediated by switches, firewalls, proxies, or other gateways that implement address or port filtering and translation, e.g. network address translation (NAT). Connectivity restrictions are typically applied to protect the internal devices from malicious accesses in inbound traffic that travels from outside to inside the managed network. Upcoming generations of communication systems, such as Fifth Generation (5G) communication systems and Industry 4.0, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. The number of devices in managed networks is therefore expected to grow dramatically, which raises new security issues for inbound traffic to the managed network, outbound traffic from the managed network, and internal traffic within the managed network.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional security techniques are insufficient to address the challenges presented by smaller embedded devices deployed in IoT networks, such as devices that are too numerous to track individually, closed devices provided by different (and sometimes unknown) vendors, and devices that can execute (potentially malicious) code. Examples of conventional security techniques implemented in managed networks include a NAT port mapping protocol that allows devices within a managed network to configure a serving gateway to translate and forward packets to the devices, a Universal Plug & Play protocol that is used to open ports for incoming connections towards a client in the managed network, and application-level gateways that create customized NAT traversal filters that are plugged into the gateway to support address and port translation for particular application layer control/data protocols. However, conventional configuration or access control protocols are implemented at the device level and services are represented by port numbers that can be easily hijacked. Furthermore, conventional configuration or access control protocols provide application-oriented NAT traversal based on IP/port filtering that grants access to a particular device. In some cases, access is granted for a long or unlimited time, which increases the vulnerability. These protocols are therefore prone to IP spoofing, masquerade attacks, and other malicious access techniques.

FIGS. 1-5 disclose embodiments of a controller that provides secure connectivity to devices in a managed network, which is connected to an external network via a gateway, by configuring infrastructure in the managed network in response to receiving a network access request (NAR) associated with an application or an activity associated with an application executing on a device in the managed network. The NAR includes a timestamp, an identifier of the application, the characteristics of allowable communication (e.g. destinations or quality-of-service (QoS) requirements) and information associated with a duration of the request. Examples of the information associated with the duration include a value that represents the duration itself, an indication that the controller determines when to terminate access, and the like. Some embodiments of the NAR include an application certificate generated by a developer of the application. The NAR can include a request for access to entities within the managed network or an external network. An operating system (OS) on the device validates and stores the certificate based on application information such as hash codes of installed files. In some embodiments, the NAR is generated by the OS and the NAR includes a signature generated by the OS using a secret shared by the controller and the OS. The secret is generated during initial configuration (onboarding) of the device in the managed network.

In response to receiving the NAR, the controller determines whether to grant connectivity to the application for the requested duration. The controller grants the requested connectivity to applications indicated on a white list generated by an administrator of the controller, according to a policy, in response to receiving approval from the administrator, based on a quality-of-service (QoS) requirement, or based on other criteria. Some embodiments of the controller determine whether to grant connectivity by verifying the signature generated by the OS in the device. If access is granted to the application, the controller configures the infrastructure of the managed network, e.g., by configuring port forwarding, forwarding/routing rules, providing authorizations, and the like, perhaps using software-defined networking (SDN) techniques. The managed network (and associated gateway) provide connectivity to the application of the device for the requested duration. The application can transmit a request to release connectivity prior to the end of the requested duration or the controller can release connectivity after the requested duration. To release connectivity, the controller reverts the configuration, e.g., by canceling port forwarding, removing routing rules, revoking authorizations, and the like.

Figure 1:
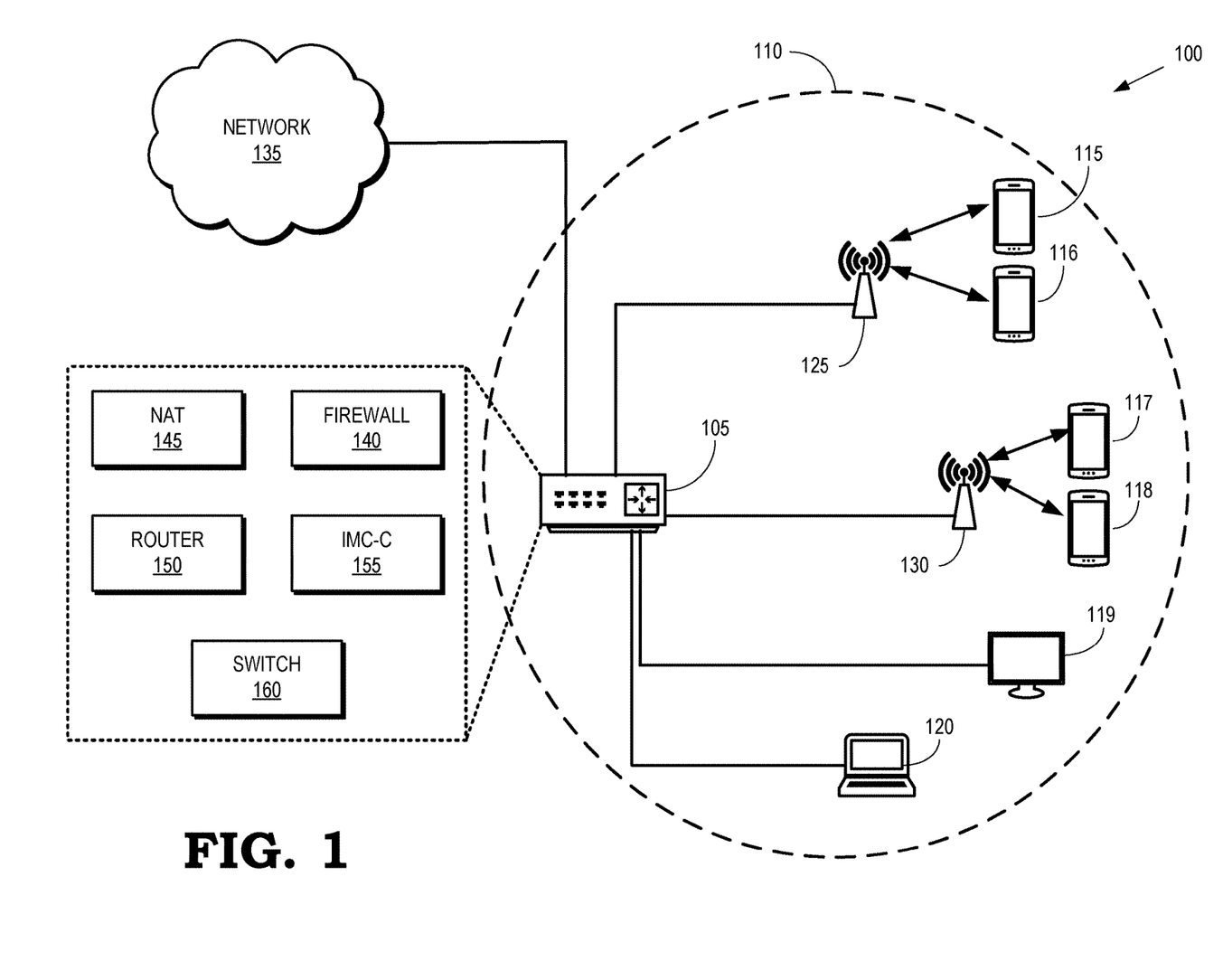
FIG. 1 is a block diagram of a communication system according to some embodiments.

FIG. 1 is a block diagram of a communication system 100 according to some embodiments. The communication system 100 includes an access device 105 in a managed network 110. For example, the access device 105 can be implemented as an access point in a local area network (LAN). The access device 105 provides wired and wireless connectivity to user equipment 115, 116, 117, 118, 119, 120, which are collectively referred to herein as "the user equipment 115-120." In the illustrated embodiment, the access device 105 is connected to access points 125, 130, which provide wireless connectivity to the user equipment 115, 116, 117, 118 over an air interface. The access device 105 also provides wired connections to the user equipment 119, 120. The user equipment 115-120 represent devices such as smart phones, tablets, smart televisions, laptop computers, sensors, and other Internet of Things (IoT) devices.

The access device 105 provides fine-grain control of network connectivity by authorizing the different activities requested by the user equipment 115-120 instead of authorizing communication on a per-device approach, e.g., authorizing the user equipment 115 to access the network 135 to support multiple activities over an indefinite period of time. As used herein, the term "activity" refers to a limited set of interactions between two processes over a network that occurs over a limited time interval or duration. Examples of activities include a sensor reporting temperature to a server, a smart phone streaming video content to a TV screen, a computer browsing a website, and the like. A single device can support multiple concurrent activities. For example, the user equipment 115 can use a first activity to stream video content received via the network 135 and the access device 105. The user equipment 115 also uses a second activity to access an ad server that provides advertisements that are inserted into the stream of video content received as part of the first activity. The duration of the first activity is set by a duration of the video content (e.g., the length of a television program) and the duration of the second activity is set by a duration of the advertisement. Thus, multiple instances of the second activity can be initiated and completed within the duration of the first activity.

The access device 105 implements functionality to mediate the communication between the user equipment 115-120 and a network 135, such as the Internet or other external network, as well as communication between entities within the managed network 110 including the user equipment 115-120 and the access points 125, 130. Some embodiments of the access device 105 implement one or more of a firewall 140 to block access based on a set of authorizations, a network address translation (NAT) element 145 to translate internal addresses for the managed network 110 to external addresses for the network 135, a router 150 to route messages associated with activities performed by applications executing on the user equipment 115-120, and a network switch 160 that is used to route intra-network traffic between entities within the managed network 110. The firewall 140, the NAT element 145, and the router 150 operate according to configuration parameters such as port forwarding, a forwarding rule, a routing rule, and authorization for the activity of the application. The configuration parameters are modified to allow or deny access to activities associated with one or more of the user equipment 115-120, as discussed herein.

The user equipment 115-120 provide requests to a controller 155 such as an instant micro-connectivity controller (IMC-C) implemented in the access device 105 to initiate communication with the network 135. The requests are referred to herein as "network access requests (NARs)" and each NAR is associated with an activity of an application executing on one of the user equipment 115-120 in the managed network 110. The NAR are emitted by applications executing on the user equipment 115-120, an operating system (OS) executing on the user equipment 115 120 (which includes a network stack that recognizes application requests), or the NAR can be inferred by network infrastructure, e.g., an observed failed attempt to connect to a URL may be turned into an NAR that is provided to the controller 155. Minimal connectivity between user equipment 115-120 and the access device 105 is needed to send NARs. Thus, the user equipment 115-120 and the infrastructure of the managed network 110 collaborate with the controller 155 to request connectivity using a protocol such as limited L2 broadcast or direct L3 communication. The NAR includes the details of the incoming network activity such as a protocol, one or more ports, a duration of the activity, an application identity, and the like, as discussed in detail below.

The NAR indicates a request for access to the network 135 by the application for a duration of the activity. The NAR therefore includes includes information indicating the duration and a timestamp to prevent (or at least reduce the likelihood of) replay attacks. Some embodiments of the NAR also include additional information such as one or more of an identifier of the application, a source address, a destination address, a quality-of-service (QoS) requirement for the application, and an application certificate generated by a developer of the application. In some embodiments, the OS executing on the requesting user equipment 115-120 generates a signature based on a secret known to the OS executing on the user equipment 115-120 and the controller 155. If available, the NAR is signed with the signature generated by the OS and the controller 155 and verifies that the NAR is from the requesting user equipment 115-120 using the received signature and the stored secret.

In response to receiving the NAR, the controller 155 selectively grants the request based on information included in the NAR. Some embodiments of the controller 155 rely on a decision point to accept or deny the request. In some cases, the decision point uses a white list to indicate that requests from listed activities, applications, or user equipment 115-120 should be accepted. The controller 135 can also transmit requests to users to get approval for the NAR, accept or deny the request based on enforcing QoS requirements, or use other criteria to selectively grant the request. For example, the controller 155 can selectively grant the request based on some or all of an application identifier, a user identifier, a device identifier, a protocol, a port, an available bandwidth in the managed network 110, available ports, cost, time of day, and the like. The controller 155 can also perform additional challenges to authorize and authenticate the application, the user equipment 115-120, or a certificate provided in the NAR. Manual user validation can also be performed.

If the controller 155 grants the request, the controller 155 generates configuration information for the managed network 110. In some embodiments, the controller 155 dynamically configures infrastructure of the managed network 110, e.g., using SDN technologies or by editing firewall, forwarding, or routing rules to configure the firewall 140, NAT 145, router 150, and network switch 160, respectively. The controller 155 is therefore able to realize tailored communication for accepted NARs by mapping properties or attributes indicated by the NAR onto the network configuration. For example, the controller 155 can authorize ports, source addresses, or destination addresses on network components such as the firewall 140, the NAT 145, the router 150, or the network switch 160. Once configured, the activity or application communicates with the network 135 using conventional processes. The controller 155 becomes fully transparent to the end-user in the application.

The controller 155 revokes previously granted connectivity privileges according to expiration instructions associated with the NAR, activity, application, or user equipment 115-120. The expiration instructions include an indication that the granted connectivity expires after a predetermined time interval indicated in the NAR, in response to the access device 105 or the controller 155 initiating revocation, based on application or activity-specific metrics, and the like. The end of the activity depends on the required control granularity. The controller 155 can therefore implement different activity durations ranging from per-packet authorization to extended authorization time intervals (e.g., milliseconds or seconds) depending on infrastructure defaults and the requirements of the activity or application. An authority for the infrastructure is therefore able to adjust the balance to satisfy competing demands for security and performance because enhancing security increases traffic overhead.

The controller 155 reverts the configuration of the managed network 110 to its previous configuration in response to revoking the granted connectivity privileges. Reverting the configuration includes canceling port forwarding, removing the forwarding rule, removing the routing rule, revoking the authorization, and the like. Once the privileges have been revoked, the activity, application, or user equipment 115-120 is required to transmit a new request to access the network 135. The network configuration for the activity requested by the NAR remains strictly dedicated and limited to the authorized activity, which greatly reduces the attack surface on the devices in the managed network 110 because no packets routed on the managed network 110 belong to unauthorized activity. Moreover, the activities are associated with certified applications, which reduces the likelihood that rogue code or processes reuse legitimately open ports.

Figure 2:
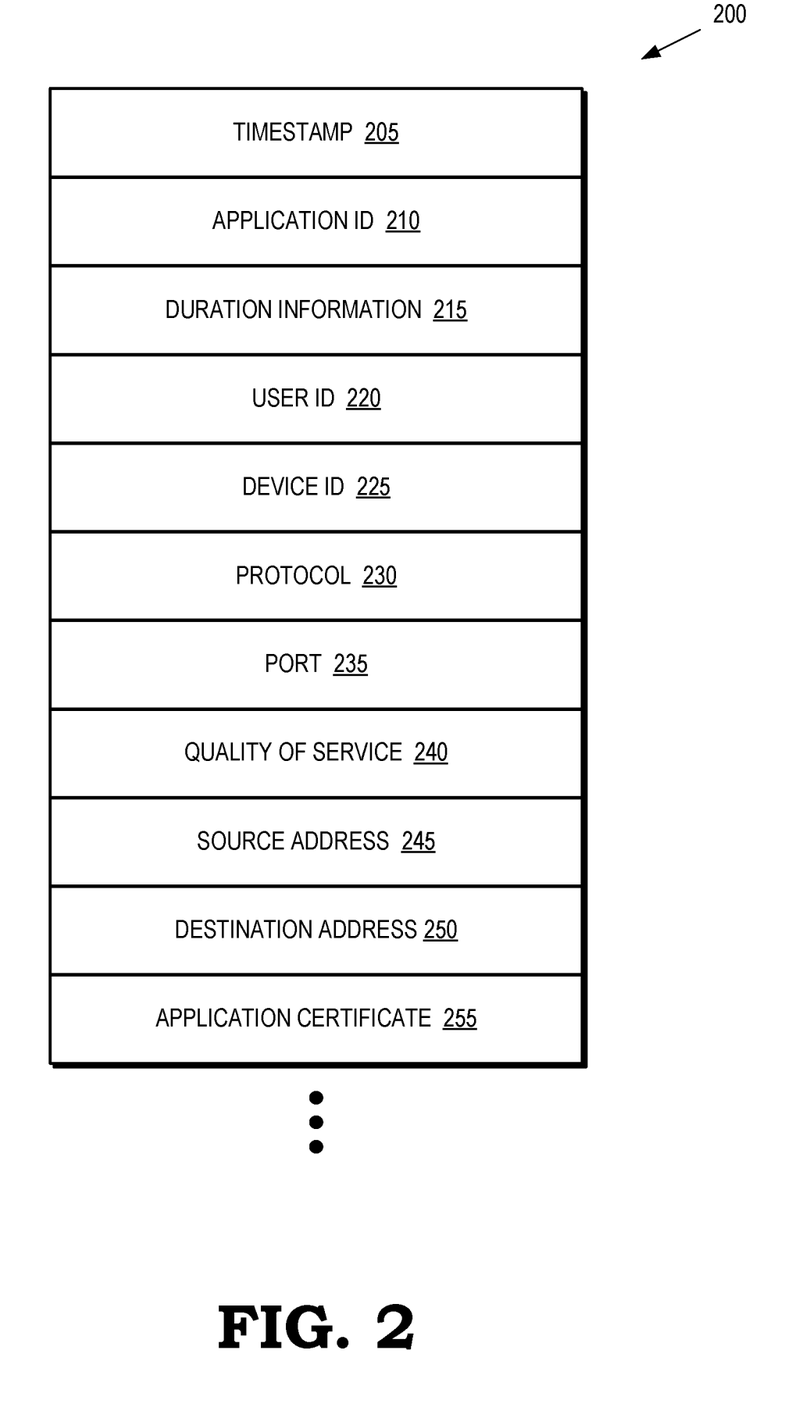
FIG. 2 is a block diagram of a network access request (NAR) that is transmitted to request access for an activity of an application according to some embodiments.

FIG. 2 is a block diagram of a network access request (NAR) 200 that is transmitted to request access for an activity of an application according to some embodiments. The NAR 200 is transmitted by some embodiments of the user equipment 115-120 shown in FIG. 1 or generated by network infrastructure of the managed network 110 shown in FIG. 1, as discussed herein. The NAR 200 includes a timestamp 205 that indicates when the NAR 200 was generated. The timestamp 205 is used to prevent replay attacks. The NAR 200 also includes an application identifier 210 that identifies the requesting application on the user equipment and duration information 215 that indicates how the requested duration is determined. In some embodiments, the duration information 215 includes a value that represents the duration, an indication that the controller that receives the NAR 200 determines when access is terminated, and an indication of an application-specific metric that is used to determine when to terminate access. The NAR 200 further includes a user identifier 220, a device identifier 225, a protocol 230 used for the communication, a port 235 used for the communication, and a required QoS 240. The NAR 200 further includes a source address 245 of the requesting device, a destination address 250 in the network, and an application certificate 255 generated by a developer of the application.

The following excerpt is an example of JSON-formatted NAR that represents a request for a Fastweb v1.2 application (developed by homemade-apps.com), running on Bob's device with MAC address 00:A0:C9:14:C8:29 and IP 192.168.0.10, needing connectivity to IP address 85.12.251.12 for 10 seconds on TCP ports 80 and 443, respectively using HTTP and HTTPS protocols. The provided information is signed by the requester's OS (with the secret shared by IMC-C obtained at onboarding time) to avoid data tampering and the unique ID and timestamp are used to prevent replay attacks. Alternatively, a binary version of the NAR could be used.

```
{
  "nar_id":9458125425,
  "timestamp":1549362599,
  "source":"192.168.0.10",
  "destination":"85.12.251.12",
  "endpoints":[
    {
      "port":443,
      "proto":"tcp",
      "type":"https"
    },
    {
      "port":80,
      "proto":"tcp",
      "type":"http"
    }
  ],
  "duration":10,
  "certificate":{
    "name":"Fastweb v1.2b",
    "id":"4f4d8d91-eaff-4498-883e-79e5b605a1d8",
    "issuer":"homemade-apps.com"
  },
  "requester":{
    "user":"Bob",
    "device":"00:A0:C9:14:C8:29"
  },
  "signature":
    "a7ffc6f8bf1ed76651c14756a061d662f580ff4de43b-
    49fa82d80a4b80f8434a"
```

Figure 3:
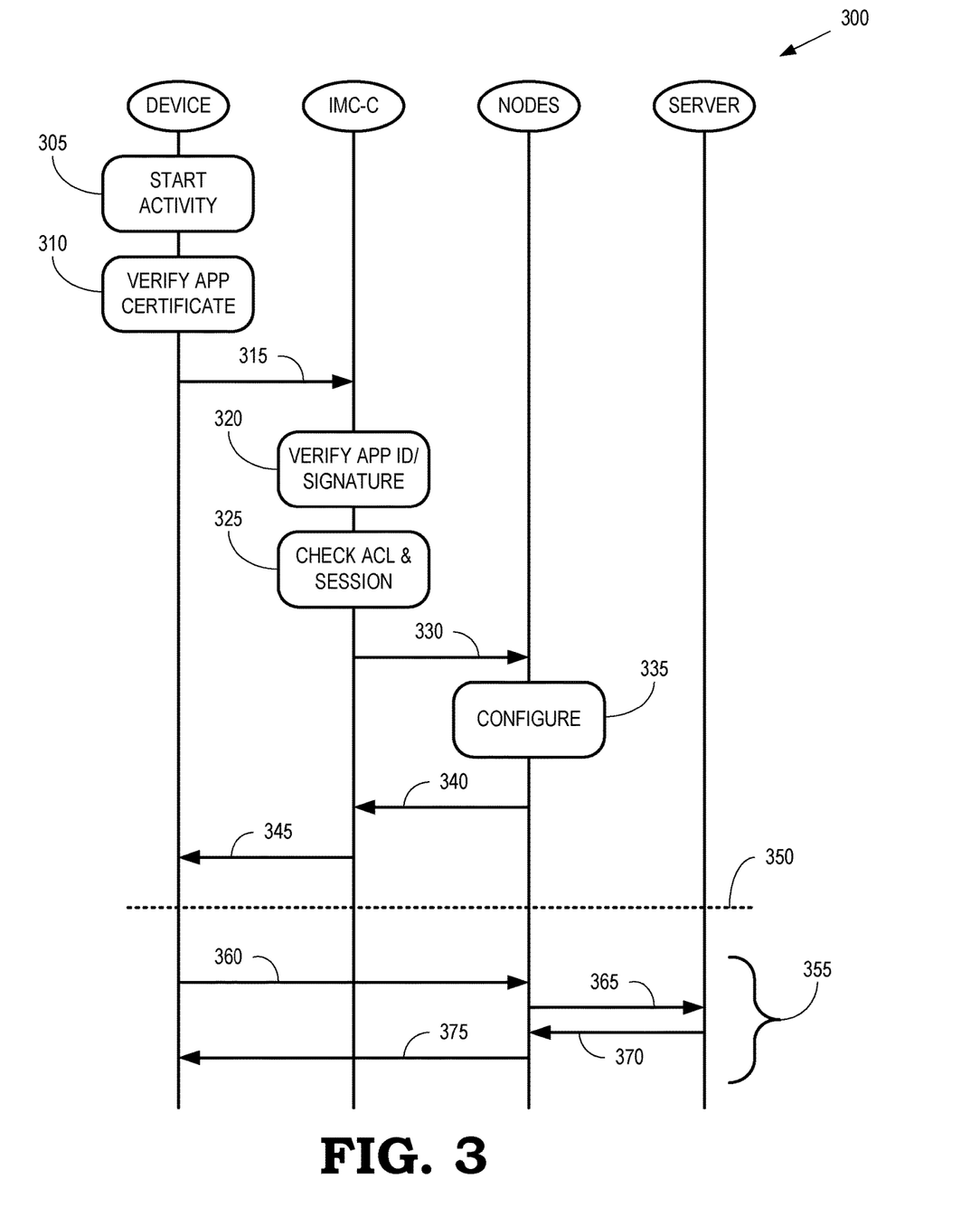
FIG. 3 is a first portion of a message sequence diagram that illustrates a message exchange for configuring a network to allow activity-specific communication according to some embodiments.

FIG. 3 is a first portion 300 of a message sequence diagram that illustrates a message exchange for configuring a network to allow activity-specific communication according to some embodiments. The first portion 300 of the message sequence is implemented in some embodiments of the communication system 100 shown in FIG. 1. The message exchange is used to allow an authorized web browser to access a Web server. In the illustrated embodiment, the message sequence includes messages that are exchanged between, and actions performed by, a device (such as the user equipment 115-120 shown in FIG. 1), an NAR to a controller (such as the IMC-C 155 shown in FIG. 1), one or more network nodes (NODES), and an authorized Web server (SERVER).

At block 305, the user equipment starts an activity. In the illustrated embodiment, a user of the user equipment browses to a webpage provided by the authorized Web server. The browser attempts to establish a transmission control protocol (TCP) connection with a destination IP address associated with the Web server.

At block 310, an OS on the user equipment verifies an application certificate such as an application certificate for the web browser implemented on the user equipment. In some embodiments, the application is registered by the device's OS when the application is installed on the user equipment. The OS validates and stores a certificate provided by the application's developer or issuer. The certificate includes information about the installed files (e.g. hash codes) and the certificate is signed by the issuer. The OS checks the local hashes and verifies the certification chain, if necessary. The application certificate is not required by the IMC-C, however the IMC-C is aware of what devices are connected (onboarding phase/DHCP) and shares a secret with the corresponding operating systems to be able to sign every subsequent NAR. This security option provides additional security but remains optional for devices that do not have sufficient processing power to implement the security option, e.g., relatively "dumb" IoT devices.

In response to verifying the application certificate, the user equipment transmits an NAR to the controller, as indicated by the arrow 315. For example, the user equipment can transmit an NAR in the format of the NAR 200 shown in FIG. 2. In the illustrated embodiment, the NAR includes at least application identifier and a device signature that is generated by the OS using a secret known to the OS and the controller.

At block 320, the controller verifies the application identifier and the device signature. The controller verifies the device signature using the stored secret known to the controller and the OS of the user equipment. At block 325, the controller checks an access control list (ACL or white list) and other session properties indicated in the NAR. In the illustrated embodiment, controller determines that the certified identity of the application is allowed (e.g., by being white-listed by a local authority), the device/user/owner are allowed, and any requirements specified in the NAR are acceptable such as QoS requirements, requested ports, requested protocol, and the like.

In response to successfully verifying, the controller enables connectivity to network nodes and the Web server, as indicated by the arrow 330. In some embodiments, the controller configures the local network nodes to allow the requested connectivity (e.g., via UPnP, SD-LAN, etc.). For example, the controller can configure port forwarding and firewall rules on one or more gateways for outgoing TCP ports such as the ports 443 and 80. For another example, the controller can configure routing rules on one or more intermediary nodes.

At block 335, the network nodes are configured in accordance with the instructions provided by the controller. In response to configuring the network nodes, an acknowledgment message is provided to the controller, as indicated by the arrow 340. The controller then provides an acknowledgment of the successful configuration to the user equipment, as indicated by the arrow 345. Some embodiments of the acknowledgment include information indicating a session identifier. The controller also registers the new session to be tracked and the associated expiration events such as expiration of a time interval or duration, termination messages, and the like.

In response to acceptance of the requested access, the OS network stack performs a TCP handshake with the remote host, e.g. the Web server. Connectivity is only established for the requesting user equipment and other devices remain network restricted. Other ports and destinations remain inaccessible to the user equipment.

The requesting application is authorized to communicate with the Web server beginning at the dotted line 350. In the illustrated embodiment, the application executing on the user equipment performs one or more message exchanges 355 with the Web server. The message exchange 355 includes an HTTP get message 360 directed to an IP address of the Web server, which is received by the network nodes and forwarded to the Web server, as indicated by the arrow 365. The Web server responds with an HTTP reply message 370, which the network nodes forward to the application executing on the user equipment, as indicated by the arrow 375. Although a single message exchange 355 shown in FIG. 3, any number of message exchanges can be performed until the expiration of the access grant and revocation/reversion of the network configuration.

Figure 4:
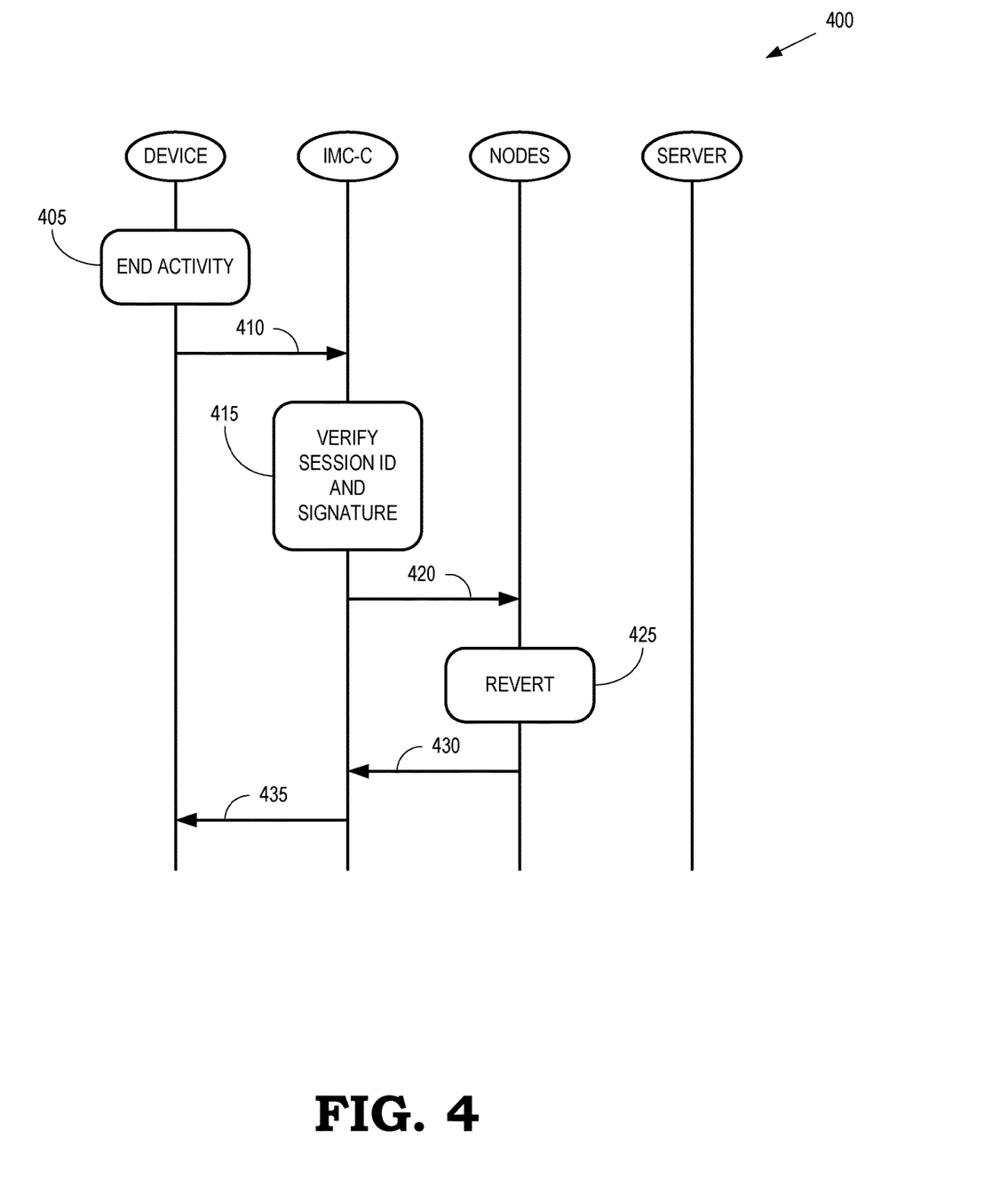
FIG. 4 is a second portion of the message sequence diagram that illustrates a message exchange for configuring a network to allow activity-specific communication according to some embodiments.

FIG. 4 is a second portion 400 of the message sequence diagram that illustrates a message exchange for configuring a network to allow activity-specific communication according to some embodiments. The second portion 400 is performed subsequent to some embodiments of the first portion 300 of the message sequence shown in FIG. 3. The second portion 400 is implemented in some embodiments of the communication system 100 shown in FIG. 1.

At block 405, the requested activity ends. In the illustrated embodiment, the requested activity ends in response to the user equipment successfully completing download of the webpage. However, as discussed herein, other events can trigger the end of the activities such as expiration of a requested duration, signaling from the controller, or reaching an application-specific metric.

In response to the activity ending, the user equipment transmits a message 410 releasing connectivity. Some embodiments of the message 410 are generated by the application or the OS and include a device signature and a session identifier.

At block 415, the controller verifies the device signature and the session identifier that are included in the release message 410. In response to verifying the device signature and the session identifier, the controller transmits a message 420 that disables connectivity in the nodes of the managed network. Disabling connectivity includes reverting the network configuration to a previous configuration that does not allow the application on the user equipment to access the network.

In response to receiving the message 420, the nodes revert the network configuration at block 425. Reverting the network configuration may include canceling port forwarding, removing a forwarding rule, removing a routing rule, and revoking an authorization. The nodes acknowledge the request to disable connectivity in response to reverting the network configuration, as indicated by the arrow 430, and the controller notifies the user equipment that access to the network for the activity associated with the application is disabled. From this point on, the application is not authorized to access the network until a subsequent NAR is submitted and approved for a subsequent activity.

Figure 5:
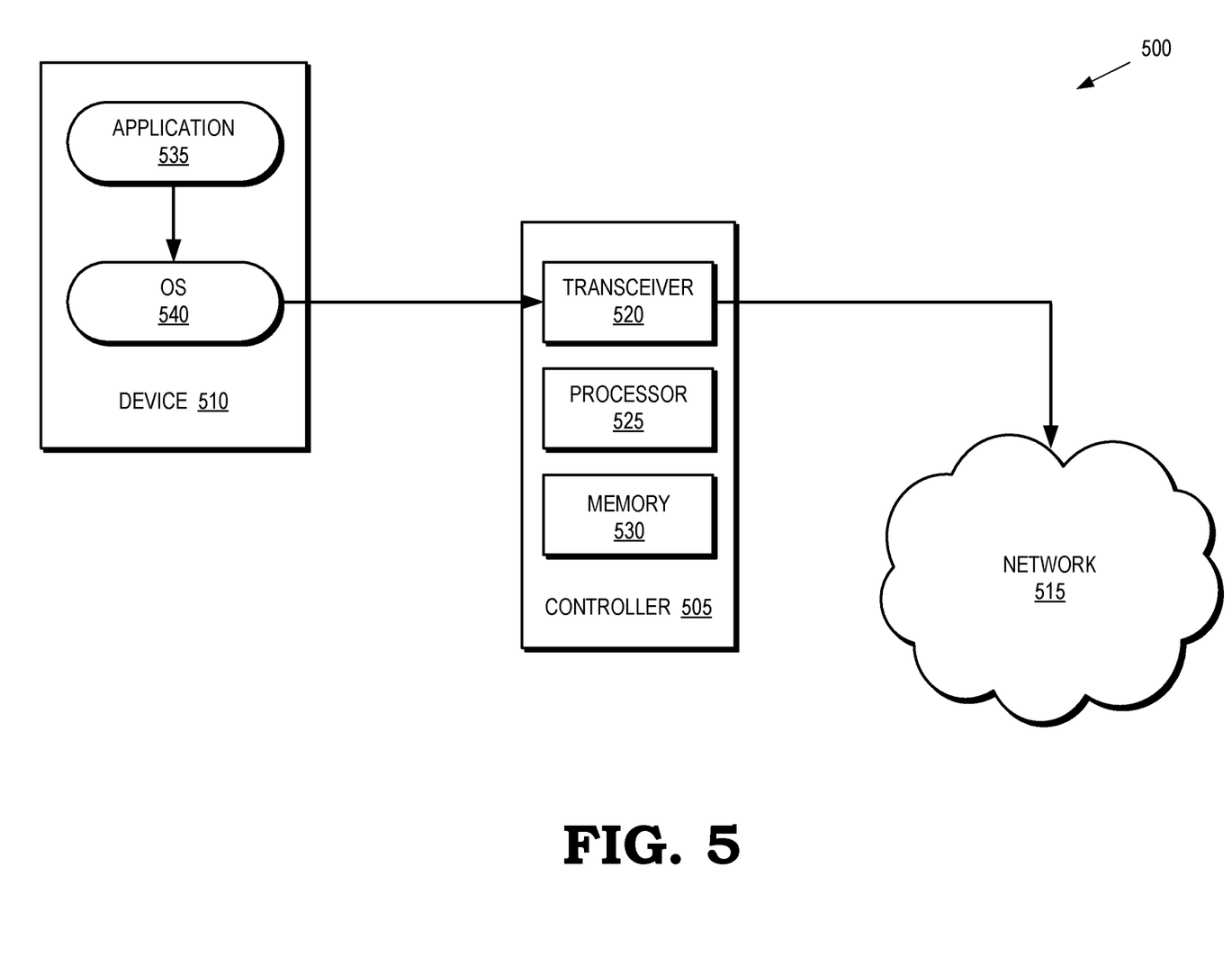
FIG. 5 is a block diagram of communication system that selectively grants devices access to an external network on an activity-specific basis according to some embodiments.

FIG. 5 is a block diagram of communication system 500 that selectively grants devices access to an external network on an activity-specific basis according to some embodiments. The communication system 500 includes a controller 505 that mediates communication between a device 510 and a network 515. The communication system 500 therefore represents portions of the communication system 100 shown in FIG. 1.

The controller 505 includes a transceiver 520 that supports communication with other entities including the device 510 and the network 515. The transceiver 520 may be implemented as a single integrated circuit (e.g., using a single ASIC or FPGA) or as a system-on-a-chip (SOC) that includes different modules for implementing the functionality of the transceiver 520. The controller 505 also includes a processor 525 and a memory 530. The processor 525 executes instructions stored in the memory 530 and stores information in the memory 530 such as the results of the executed instructions. The transceiver 520, the processor 525, and the memory 530 may therefore be configured to implement some embodiments of the portions 300, 400 of the message sequence shown in FIGS. 3 and 4.

The device 510 includes hardware such as a processor, memory, and transceiver (not shown in the interest of clarity). The device 510 implements one or more applications 535 and an OS 540. As discussed herein, the application 535 or the OS 540 can generate (or cause to be generated) an NAR, which is transmitted to the controller 505 that selectively grants access to the application based on the contents of the NAR. In response to granting access, the device 510 configures the network 515, as discussed herein.

In some embodiments, the applications originate the NAR themselves or the NAR are derived from network monitoring by the infrastructure, e.g. using a Machine-Learning approach. In some embodiments, end-to-end QoS related NAR trigger a mapping of corresponding communication flows beyond the local network onto 5G slices of corresponding QoS.

Some embodiments of the techniques and devices disclosed herein provide several advantages over current networking realizations with regard to both security and to providing connectivity tailored to application needs. For example, security-wise, the implementing a controller to selectively grant access on an activity-specific basis based on an NAR drastically reduces the attack surface of devices and networks by dynamically allowing only necessary and approved connectivity. Selectively granting access requests on an activity-specific basis also prevents multiple threats such as port reuse, rogue processes IP spoofing, man-in-the-middle, Denial of Service, masquerading, and the like. Some embodiments also allow the controller to easily identify applications without relying on weak heuristics such as standard port usage and to support value-added services by enabling handling of differentiated Quality of Service (QoS) on traditionally best effort local networks.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
    i. a combination of analog and/or digital hardware circuit(s) with software/firmware and
    ii. any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
 a transceiver configured to receive a first network access request (NAR) associated with a first activity of an application executing on a device in a managed network and a second NAR associated with a second activity of the application, wherein the first NAR and the second NAR indicate requests for access by the application for first and second durations of the first and second activities, respectively; and
 a processor configured to selectively grant the requests based on information included in the first NAR and the second NAR and generate configuration information for the managed network in response to granting at least one of the requests.

2. The apparatus of claim 1, wherein the first NAR and the second NAR comprise at least one of first and second values that represent the first and second durations, respectively.

3. The apparatus of claim 1, wherein the first and second NAR further comprise at least one of an identifier of the application, a source address, a destination address, a quality-of-service (QoS) requirement, and an application certificate generated by a developer of the application.

4. The apparatus of claim 3, further comprising:
 a memory configured to store information included in the first NAR and the second NAR.

5. The apparatus of claim 4, wherein the first NAR and the second NAR are generated by an operating system (OS) executing on the device, and wherein the first NAR and the second NAR comprise signatures generated by the OS using a secret known to the OS and the apparatus, wherein the secret is stored in the memory.

6. The apparatus of claim 4, wherein the processor is configured to selectively grant at least one of the requests based on at least one of a white list stored in the memory, a policy stored in the memory, in response to receiving approval from an administrator, and the QoS requirement indicated in the first NAR and the second NAR.

7. The apparatus of claim 1, further comprising at least one of:
 a network switch to support intra-network connectivity;
 a firewall to block access based on a set of authorizations;
 a network address translation (NAT) element to translate internal addresses for the managed network to external addresses for the external network; and
 a router to route messages associated with the first NAR and the second activities of the application.

8. The apparatus of claim 7, wherein the processor is configured to generate configuration information used to configure at least one of the network switch, the firewall, the NAT element, and the router.

9. The apparatus of claim 7, wherein the configuration information comprises information used to configure at least one of port forwarding, a forwarding rule, a routing rule, and authorization for the first and second activities of the application.

10. The apparatus of claim 9, wherein the processor releases connectivity for the first and second activities of the application by reverting the configuration to a previous configuration.

11. The apparatus of claim 10, wherein the processor reverts the configuration by at least one of canceling port forwarding, removing the forwarding rule, removing the routing rule, and revoking the authorization.

12. A method comprising:
 receiving, at an access device, a first network access request (NAR) associated with a first activity of an application executing on a device in a managed network, wherein the first NAR indicates a first request for access by the application for a first duration of the first activity;
 receiving, at the access device, a second NAR associated with a second activity of the application, wherein the second NAR indicates a second request for access by the application for a second duration of the second activity;
 selectively granting, at the access device, at least one of the first request and the second request based on information included in the first NAR and the second NAR; and
 generating, at the access device, configuration information for the managed network in response to granting the at least one of the first request and the second request.

13. The method of claim 12, wherein receiving the first NAR and the second NAR comprises receiving first NAR and the second NAR that comprise first and second values that represent the first and second durations, respectively.

14. The method of claim 12, wherein receiving the first NAR and the second NAR further comprises receiving first NAR and the second NAR comprising at least one of an identifier of the application, a source address, a destination address, a quality-of-service (QoS) requirement, and an application certificate generated by a developer of the application.

15. The method of claim 14, further comprising:
 storing information included in the first NAR and the second NAR in a memory.

16. The method of claim 15, further comprising:
 generating a signature at an operating system (OS) executing on the device, and wherein generating the first NAR and the second NAR comprises generating the first NAR and the second NAR at the OS and including the signature in the first NAR and the second NAR.

17. The method of claim 15, wherein selectively granting the first and second requests comprises selectively granting the first and second requests based on at least one of a white list stored in the memory, a policy stored in the memory, in response to receiving approval from an administrator, and the QoS requirement indicated in the first NAR and the second NAR.

18. The method of claim 12, wherein generating the configuration information comprises generating configuration information used to configure at least one of:
 a network switch to support intra-network connectivity;
 a firewall to block access based on a set of authorizations;
 a network address translation (NAT) element to translate internal addresses for the managed network to external addresses for the external network; and
 a router to route messages associated with the first and second activities of the application.

19. The method of claim 18, wherein generating the configuration information comprises generating configuration information used to configure at least one of port forwarding, a forwarding rule, a routing rule, and authorization for the first and second activities of the application.

20. The method of claim 19, further comprising:
 releasing connectivity for the first and second activities of the application by reverting the configuration to a previous configuration.

21. The method of claim 20, wherein reverting the configuration comprises at least one of canceling port forwarding, removing the forwarding rule, removing the routing rule, and revoking the authorization.

22. An apparatus comprising:
at least one processor; and
at least one memory including computer program code;
the at least one memory and the computer program code configured to, with the at least one processor, cause the apparatus at least to perform:
receiving a first network access request (NAR) associated with a first activity of an application executing on a device in a managed network, wherein the first NAR indicates a first request for access by the application for a first duration of the first activity;
receiving, at the device, a second NAR associated with a second activity of the application, wherein the second NAR indicates a second request for access by the application for a second duration of the second activity;
selectively granting at least one of the first and second requests based on information included in the first NAR and the second NAR, respectively; and
generating configuration information for the managed network in response to granting the at least one of the first and second requests.

23. The apparatus of claim 1, wherein the first duration is longer than the second duration.

24. The apparatus of claim 23, wherein the transceiver is configured to receive a plurality of second NAR comprising a plurality of second requests for access by the application for a plurality of second durations that are concurrent with the first duration.

25. The apparatus of claim 1, wherein the first NAR comprises a first timestamp and information indicating the first duration, and wherein the second NAR comprises a second timestamp and information indicating the second duration.

26. The method of claim 12, wherein the first duration is longer than the second duration.

27. The method of claim 26, wherein receiving the second NAR comprises receiving a plurality of second NAR comprising a plurality of second requests for access by the application for a plurality of second durations that are concurrent with the first duration.

28. The method of claim 12, wherein receiving the first NAR comprises receiving the first NAR comprising a first timestamp and information indicating the first duration, and wherein receiving the second NAR comprises receiving the second NAR comprising a second timestamp and information indicating the second duration.

\* \* \* \* \*